United States Patent
Diep et al.

(10) Patent No.: US 9,264,743 B1
(45) Date of Patent: Feb. 16, 2016

(54) DELIVERY SYSTEM FOR INTERNET CONTENT

(75) Inventors: Timothy Diep, Portsmouth, NH (US); David Coletti, Sudbury, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2251 days.

(21) Appl. No.: 11/851,181

(22) Filed: Sep. 6, 2007

(51) Int. Cl.
*H04N 7/173* (2011.01)
*H04N 21/234* (2011.01)

(52) U.S. Cl.
CPC .................................. *H04N 21/234* (2013.01)

(58) Field of Classification Search
CPC .................................................. H04N 21/234
USPC ........................................................ 725/95, 93
See application file for complete search history.

(56) References Cited

U.S. PATENT DOCUMENTS

| | | | |
|---|---|---|---|
| 6,785,733 B1* | 8/2004 | Mimura et al. | 709/236 |
| 2003/0093799 A1* | 5/2003 | Kauffman et al. | 725/86 |
| 2005/0188415 A1* | 8/2005 | Riley | 725/116 |
| 2007/0157280 A1* | 7/2007 | Michael et al. | 725/126 |
| 2007/0189235 A1* | 8/2007 | Chandra et al. | 370/335 |
| 2008/0066096 A1* | 3/2008 | Wollmershauser et al. | 725/32 |

* cited by examiner

*Primary Examiner* — Nasser Goodarzi
*Assistant Examiner* — Michael Hong
(74) *Attorney, Agent, or Firm* — Harrity & Harrity, LLP (57) ABSTRACT

A method may include providing a service to a customer premise device, the service including at least one of television service or Internet service, receiving a request for Internet content from the customer premise device, retrieving the Internet content, conditioning the Internet content according to at least one of a type of data of the Internet content or the service from which the request is received, allocating resources for delivering the Internet content based on one or more requirements associated with the type of data of the Internet content, and delivering the Internet content to the customer premise device.

25 Claims, 9 Drawing Sheets

DELIVERY SYSTEM FOR INTERNET CONTENT

BACKGROUND

Internet Television (ITV) is gradually becoming a popular addition to television viewing given the additional content available on the Internet. However, the ITV platform may be hampered with quality of service (QOS) and reliability issues. For example, a live video broadcast may be delivered over a data connection via an Internet Protocol Television (IPTV) set top box (STB) without any resource allocation. Additionally, within an ITV infrastructure, there may be no difference in the processing of the live video broadcast (e.g. formatting or conditioning) for delivery purposes versus the processing of another type of data (e.g., non-real-time data) for delivery purposes. As a result, delivering the Internet content in competition with other data on the same data channel and/or processing Internet content without consideration of the type of Internet data may lead to a degradation of service quality and reliability.

SUMMARY

According to one aspect, a method may include providing a service to a customer premise device, where the service including at least one of television service or Internet service, receiving a request for Internet content from the customer premise device, retrieving the Internet content, conditioning the Internet content according to at least one of a type of data of the Internet content or the service from which the request is received, allocating resources for delivering the Internet content based on one or more requirements associated with the type of data of the Internet content, and delivering the Internet content to the customer premise device.

According to another aspect, a method may include providing a service to a customer premise device, where the service may include at least one of television service or Internet service, receiving a request for Internet content from the customer premise device, retrieving the Internet content, conditioning the Internet content based on a type of data of the Internet content, and delivering the Internet content to the customer premise.

According to yet another aspect, a method may include providing a service to a customer premise device, where the service may include at least one of television service or Internet service, receiving a request for Internet content from the customer premise device, retrieving the Internet content, dedicating resources based on a type of data of the Internet content, and delivering the Internet content to the customer premise.

According to another aspect, a system may include a network to deliver a service to a customer premise device, where the service may include at least one of television service or Internet service. The network may include one or more processors to receive a request for Internet data from the customer premise device, obtain the Internet data, perform one or more processes on the Internet data, where the one or more processes may be based on a type of the Internet data to be delivered, dedicate network resources to deliver the Internet data based on network resource requirements associated with the type of the Internet data, and deliver the Internet data to the customer premise device.

According to yet another aspect, a device may include a memory and a processor to store one or more network policies, receive a request for Internet content from a customer premise device, determine whether the request from the customer premise device is based on at least one of a television service connection or an Internet service connection, and issue one or more commands to another device based on the one or more network policies. The one or more commands may include a command to condition the Internet content according to a type of data of the Internet content.

According to yet another aspect, a device may include a memory and a processor to store one or more network policies, receive a request for Internet content from a customer premise device, determine whether the request from the customer premise device is based on at least one of a television service connection or an Internet service connection, and issue one or more commands to another device based on the one or more network policies. The one or more commands may include a command to dedicate resources for delivering the Internet content according to the service connection from which the request is received.

According to still another aspect, a network device may include means for storing one or more network policies for controlling one or more other network devices, means for receiving a request for Internet data from a customer premise device, means for determining a type of service connection to use to deliver the Internet data to the customer premise device based on the request, and means for issuing one or more commands to the one or more other network devices based on the one or more network policies. The one or more commands may include a command to dedicate network resources for delivering the Internet data to the customer premise device according to the type of service connection.

BRIEF DESCRIPTION OF THE DRAWINGS

The accompanying drawings, which are incorporated in and constitute a part of this specification, illustrate one or more embodiments described herein and, together with the description, explain these embodiments of the invention. In the drawings.

DETAILED DESCRIPTION

The following detailed description refers to the accompanying drawings. The same reference numbers in different drawings may identify the same or similar elements.

The term "device," as used herein, is to be broadly interpreted to include any logic, such as hardware, software, and/or a combination of hardware and software, to provide for the functionality as described herein.

Figure 1:
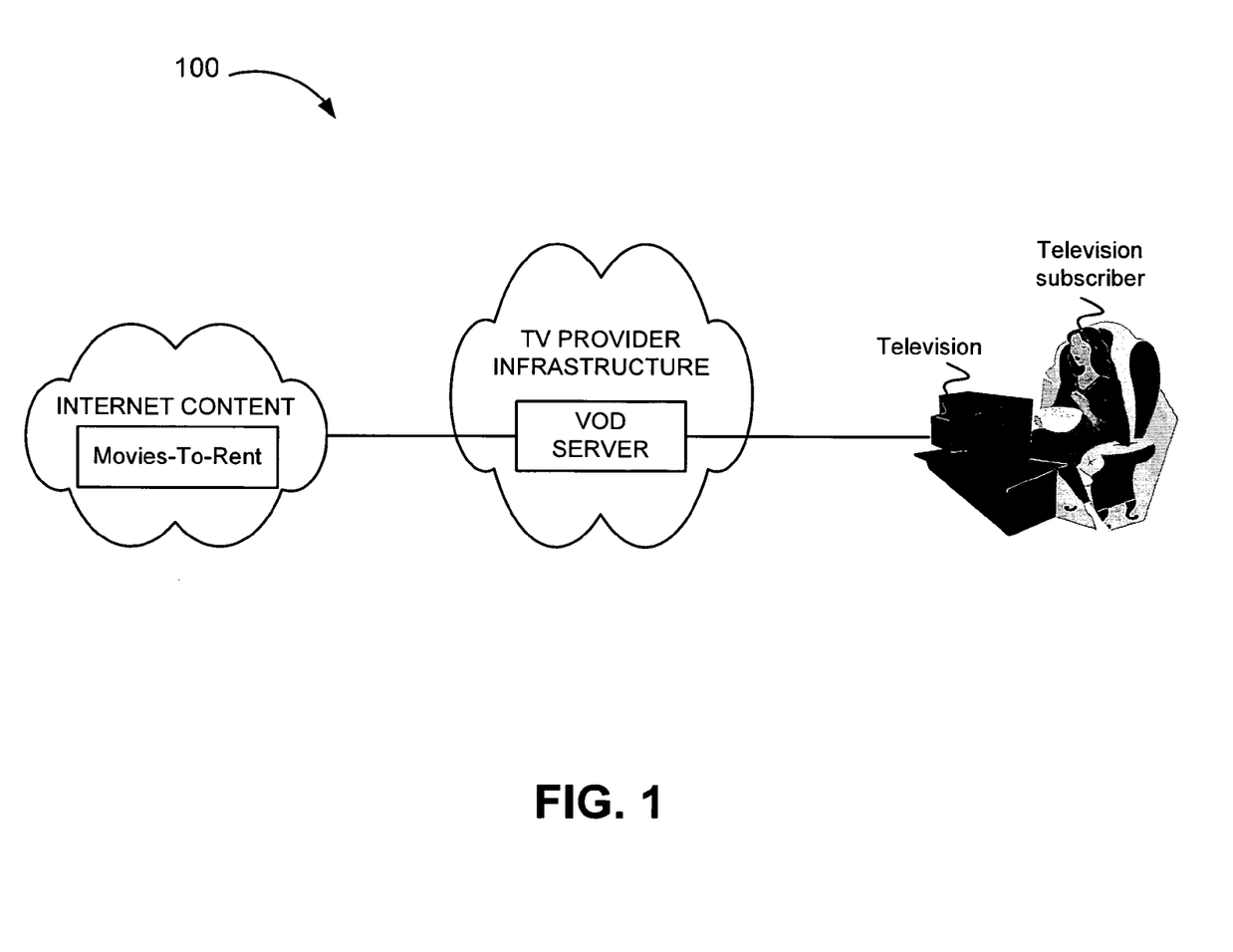
FIG. 1 is a diagram illustrating a concept 100 described herein.

FIG. 1 is a diagram illustrating a concept 100 described herein. As illustrated, concept 100 may include Internet content, a television provider infrastructure that includes a video-on-demand (VOD) server, a television and a television subscriber. In this example, the Internet content may be video content from Movies-To-Rent, a popular website. The television service provider and Movies-To-Rent may have an arrangement for video content sharing.

The television service provider may offer a VOD channel for Movies-To-Rent, and the television subscriber may have purchased a subscription to this service. The television subscriber may tune into the Movies-To-Rent VOD channel, and select, for example, from a menu system, a movie to be viewed on the television. The VOD server may obtain the selected movie from the website of Movies-To-Rent. The selected movie may be delivered to a television subscriber via the TV provider infrastructure.

In this example, the Internet content (i.e., the movie) may be delivered to the television subscriber with improved QOS and reliability compared to other delivery systems. For example, the TV provider infrastructure may allocate network resources for delivering the movie to the television subscriber. Additionally, the Internet content (e.g., IPTV packets) from the website of Movies-To-Rent may be conditioned within the TV provider infrastructure in a way that is tailored for delivering video content. In this way, Internet content may be delivered to the television subscriber with the same QOS and reliability as other television programming.

Variations to the above concept may be realized, as will be described below.

Exemplary Environment

Figure 2:
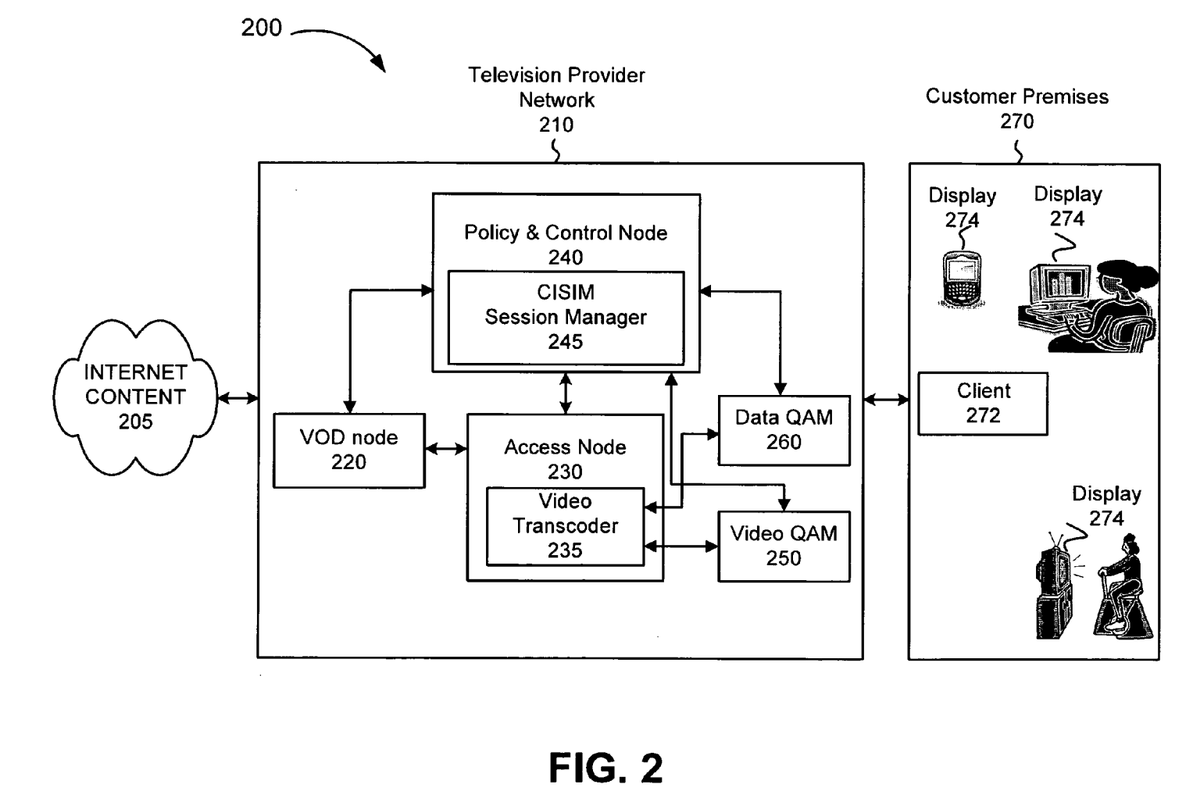
FIG. 2 is a diagram illustrating an exemplary environment 200 in which concepts described herein may be implemented.

FIG. 2 is a diagram illustrating an exemplary environment 200 in which concepts described herein may be implemented. As illustrated, environment 200 may include Internet content 205, a television provider network 210 and customer premises 270. Television provider network 210 may include a VOD node 220, an access node 230 including a video transcoder 235, a policy and control node 240 including a Cable Internet Television Simulcast (CISIM) session manager 245, a video Quadrature Amplitude Modulation (QAM) 250, and a data QAM 260. Customer premises 270 may include customer premise equipment (CPE), such as client 272 and display devices 274.

Internet content 205 may include a device on the Internet that may provide, for example, real-time data, such as video content, or other multimedia data, such as interactive applications or games. The video content may include, for example, news videos, entertainment videos, sports videos, music videos, movies, and/or live or pre-recorded video content. In other instances, multimedia data may include, for example, console-based game play, such as a PlayStation 3 game. In one example, Internet content 205 may include a web server on the Internet. Internet content 205 may include, for example, a communication interface that permits sharing of video content with VOD node 220. For example, although not illustrated, a gateway or router may reside between Internet content 205 and VOD node 220.

Television provider network 210 may include a television delivery network system that provides television programming services, such as cable, telephone, Digital Subscriber Line (DSL) (e.g., Asymmetric DSL, Very High Speed DSL, or x-DSL), satellite, wireless (e.g., Local Multipoint Distribution Service (LMDS)), fiber to the premises (FTTP), and/or combinations thereof, such as hybrid fiber-coaxial (HFC) network.

VOD node 220 may include a device that stores content for distribution. For example, VOD node 220 may include servers and mass storage devices. VOD node 220 may include content such as movies, television programs, and/or Internet content that may be viewed by a TV viewer upon request (i.e., on-demand). VOD node 220 may include, for example, a communication interface to obtain content from Internet content 205. VOD node 220 may include interactive applications and/or an electronic programming guide (EPG). For example, the interactive applications may include special promotions or discounts, or offers of video for purchasing and/or playing. The EPG may include a listing and/or a schedule of programs available for viewing.

Access node 230 may include a device that provides television content to customer premises 270. For example, access node 230 may include a router, such as an edge router. Video transcoder 235 may include a device for transcoding Internet content, such as IPTV packets. Video transcoder 235 may employ various video codecs (e.g. Moving Picture Experts Group (MPEG)-2, MPEG-4, MPEG-4 Part 10, or VC-1), for standard definition and/or high definition formats. For example, when the Internet content is video content, video transcoder 235 may generate a transport stream (e.g., a MPEG-x-TS) or a data stream (e.g., MPEG-x/Data Over Cable Service Interface Specifications (DOCSIS)). Video transcoder 235 may also perform various other processes, such as transrating, noise reduction, temporal filtering, etc.

Video QAM 250 and data QAM 260 may include a device for modulating content. For example, video QAM 250 and/or data QAM 260 may modulate a video stream employing, for example, 64-QAM or 256-QAM to produce a downstream modulated channel. In other digital video broadcast transmission systems, such as satellite, another modulation scheme may be employed (e.g., Quadrature Phase Shift Keying (QPSK)), along with Reed Solomon (RS) coding. Alternatively, other modulation schemes may be employed.

Policy and control node 240 may include a device that controls other network components in environment 200 based on network policies. For example, policy and control node 240 may include a server that controls VOD node 220, access node 230, video QAM 250, and/or data QAM 260 when a network event occurs. As depicted in FIG. 2, policy and control node 240 may have a communication link with VOD node 220, access node 230, video QAM 250 and data QAM 260.

CISIM session manager 245 may include a device that controls other network components in environment 200 when a conditional access event occurs. For example, a conditional access event may include an on-demand (OD) request, such as a VOD request. Depending on the services provided (e.g., television service or Internet service), CISIM session manager 245 may determine whether an OD request originated from, for example, an OD menu on a TV, or from a personal computer (PC) or some other display device 274 connected to the Internet. That is, in some instances, a customer may have the same service provider for both TV service and Internet service. Accordingly, an OD request may be received via a TV service connection associated with TV service, or an Internet service connection associated with Internet service.

As will be described below, CISIM session manager 245 may include a different command set for directing other network components based on whether the OD request is received via a television service connection or an Internet service connection. Additionally, or alternatively, CISIM session manager 245 may include a different command set based on the type of data of the Internet content associated with an OD request. For example, a command to access node 230/video transcoder 235 to process the Internet content may differ depending on the type of Internet content requested. Additionally, as will be described below, CISIM session manager 245 may provide commands to VOD node 220, access node 230, video QAM 250, and data QAM 260 based on network policies associated with OD requests.

Customer premises 270 may include a television subscriber environment, such as a home or an office building.

Customer premises 270 may include various customer premise equipment (CPE), such as client 272 and display devices 274.

Client 272 may include a device capable of receiving, transmitting and/or processing information to and from television provider network 210. Client 272 may include decoding and/or decryption capabilities, as well as digital rights management (DRM) and conditional access system (CAS) applications. Client 272 may provide video signals to display devices 274. In one implementation, client 272 may include a STB. Additionally, or alternatively client 272 may include, for example, a cable modem or some other type of transceiver device, such as a cable card, a TV tuner card, or a wireless router.

Display devices 274 may include a device capable of receiving and reproducing video signals. In one implementation, display device 274 may include a TV. In another implementation, display device 274 may include a computer, a stationary communication device (e.g., a telephone), a portable communication device (e.g., a mobile telephone or a personal digital assistant (PDA)), a game console (e.g., Nintendo Wii, Microsoft Xbox, or Sony PS2/PS3), etc.

Although FIG. 2 illustrates exemplary components of environment 200, in other implementations fewer, additional, or different components may be utilized. For example, one or more nodes in environment 200 may be combined into a single device and/or distributed into a number of devices. Additionally, or alternatively, one or more nodes in environment 200 may be remotely located. In one implementation, one or more nodes in environment 200 may be arranged in the "last mile" of a delivery network. Further, while FIG. 2 illustrates direct connections between the various components, any of these connections may be indirectly made via a node, a network, or a combination thereof.

Figure 3:
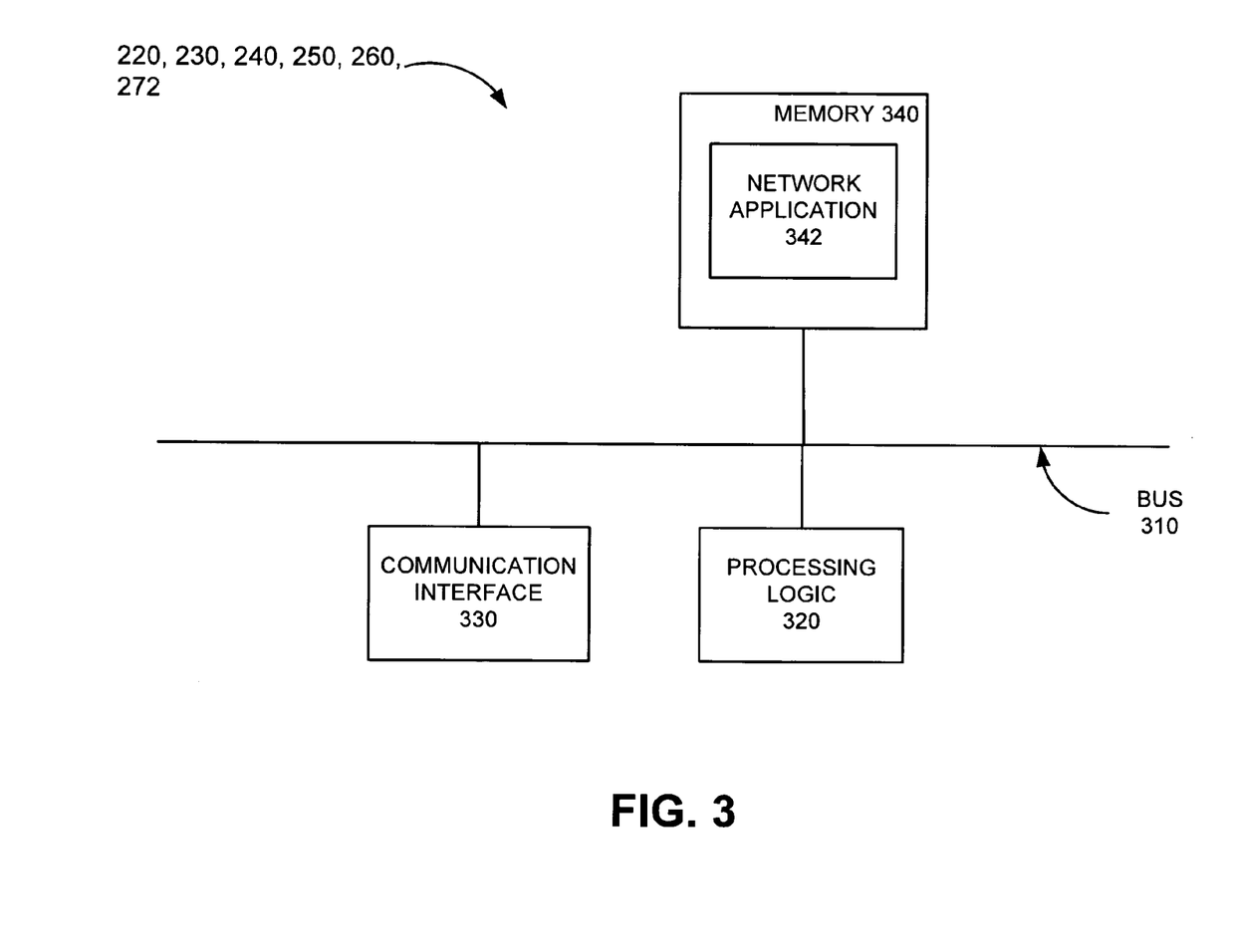
FIG. 3 is a diagram illustrating exemplary components of the VOD node, the access node, the policy and control node, the video QAM, the data QAM, and the client depicted in FIG. 2.

FIG. 3 is a diagram illustrating exemplary components of a device that may correspond to VOD node 220, access node 230, policy and control node 240, video QAM 250, data QAM 260, and client 272 depicted in FIG. 2. As illustrated, the exemplary components may include a bus 310, processing logic 320, a communication interface 330, and a memory 340.

Bus 310 may include a communication link that permits communication among the components. Processing logic 320 may include any type of processor or microprocessor that interprets and executes instructions. In another implementation, processing logic may include an application specific integrated circuit (ASIC), field programmable gate array (FPGA), etc.

Communication interface 330 may include any transceiver-like mechanism that enables communication with other devices and/or systems. Communication interface 330 may allow for wired, wireless, and/or optical communication.

Memory 340 may include a random access memory (RAM) or another type of dynamic storage device that may store information and instructions for execution by processing logic 320; a read only memory (ROM) device or another type of static storage device that may store static information and instructions for use by processing logic 320; and/or some other type of storing component, such as a magnetic or optical recording medium and its corresponding drive for storing information and/or instructions.

Memory 340 may store a network application 342. Network application 342 may include instructions for causing the device to implement operations, as described herein. These operations may be performed in response to processing logic 320 executing software instructions contained in a computer-readable medium, such as memory 340. A computer-readable medium may be defined as a physical or logical memory device and/or carrier wave. The software instructions may be read into memory 340 from another computer-readable medium or from another device via communication interface 330. The software instructions contained in memory 340 may cause processing logic 320 to perform processes as described below.

Although FIG. 3 illustrates an exemplary set of components, in other implementations, fewer, additional or different components may be used. Further, other configurations of components are possible.

Exemplary Processing

Figure 4:
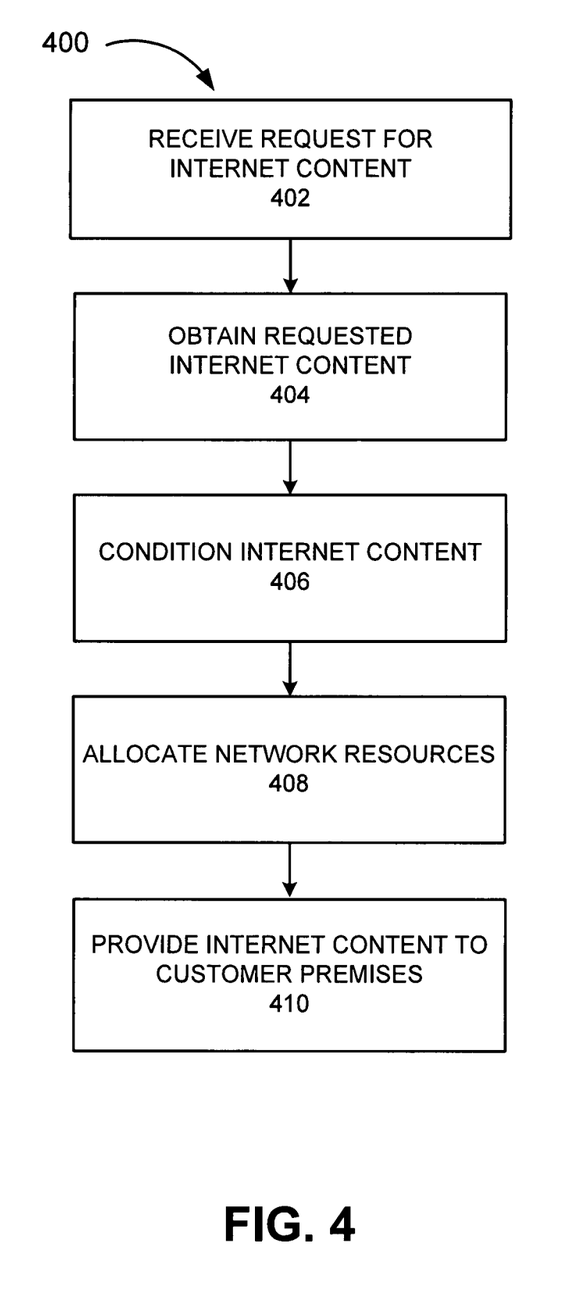
FIG. 4 is a flow chart of an exemplary process for providing Internet content to a television subscriber.

FIG. 4 is a flow chart of an exemplary process for providing Internet content to a television subscriber. Exemplary process 400 is described below in relation to exemplary environment 200.

Process 400 may begin with receiving a request for Internet content (Block 402). For example, a television subscriber receiving television service may select an Internet video, such as a live sporting event broadcast, via an interactive VOD application from his/her display device 274, such as a TV. In other situations, a television service provider may also be an Internet service provider for the television subscriber. In such instances, the television/Internet subscriber may select an Internet video using his/her personal computer (PC) or using some other display device 274. It is to be understood, however, that Internet content may include other types of multimedia content, as previously described herein. In either instance, the selection may be received by a node that manages OD requests, such as CISIM session manager 245.

The Internet content may be obtained (Block 404). For example, in one implementation, in response to an OD request, CISIM session manager 245 may provide one or more commands to VOD node 220. For example, CISIM session manager 245 may command VOD node 220 to retrieve the requested Internet content from Internet content 205. CISIM session manager 245 may provide VOD node 220 with an Internet address corresponding to Internet content 205. VOD node 220 may establish communication with Internet content 205 via a gateway, for example, and obtain the selected Internet content, such as video content. In other implementations, VOD node 220 may have previously stored the requested Internet content from Internet content 205. For example, in one implementation, VOD node 220 may periodically update its repository with respect to one or more Internet resources. In one example, VOD node 220 may receive the Internet content in the form of IPTV packets. In other examples, VOD node 220 may receive the Internet content in other formats, which may or may not require some processing (e.g., reformatting, re-packaging, etc.) depending on the platform of the delivering network (ITV packets).

Additionally, CISIM session manager 245 may command VOD node 220 to forward the requested Internet content to another node, such as access node 230, for further processing. CISIM session manager 245 may also provide additional information to VOD node 220, such as whether the request was received via a television service connection associated with television service or via an Internet service connection associated with Internet service, television channel information, data channel information, standard definition or high definition, the type of data of the Internet content, etc. For example, in one implementation, when an OD request is received via a television service connection, CISIM session manager 245 may provide VOD node 220 with television channel information. That is, the television channel information may correspond to the television channel that a TV subscriber may view his/her Internet content. VOD node 220 may forward the Internet content based on this information to, for example, access node 230. In one implementation, when the Internet content is received in the form of IPTV packets, VOD node 220 may process the received IPTV packets for delivery to access node 230. For example, VOD node 220 may forward the IPTV packets as, for example, a single program transport stream (SPTS), or another format depending on the delivery platform.

The Internet content may be conditioned (Block 406). In one implementation, CISIM session manager 245 may command access node 230 to condition the received Internet content. CISIM session manager 245 may determine how to condition the received Internet content based on the type of data of the Internet content, the service for which the request is received, and/or the service for which the Internet content is to be delivered. CISIM session manager 245 may determine the type of data of the Internet content, the service for which the request is received, and the service for which the Internet content is to be delivered, based on the information associated with the request and/or stored network policy and control information.

Depending on, for example, the arrangement between the service provider and the Internet content provider, as well as the type of service to which a customer subscribes, various possibilities may be envisioned. For example, a subscriber who requests Internet content and subscribes to only one service (e.g., television service or Internet service), CISIM session manager 245 may command access node 230 to condition the received Internet content based on the service for which the request was received. Thus, for example, CISIM session manager 245 may command access node 230 to condition the received Internet content to a data format (e.g., DOCSIS format) when the request is received via an Internet service connection. However, in other examples, when a subscriber requests Internet content and subscribes to both television service and Internet service, CISIM session manager 245 may receive a request via an Internet service connection associated with Internet service, but the Internet content may be delivered via a television service connection associated with television service. Thus, for example, CISIM session manager 245 may command access node 230 to condition the received Internet content to a transport stream when the Internet content may be delivered via a television service connection associated with television service. Alternatively, in still another example, a request via a television service connection associated with television service could provide delivery of the Internet content via an Internet service connection associated with Internet service. For example, a subscriber who owns a client 272, such as an iPhone, may not be able to watch a program at home on a television, but may request to have the Internet content delivered to his/her iPhone while on the way to the airport.

Additionally, or alternatively, CISIM session manager 245 may command access node 230 to condition the received Internet content based on the type of data of the Internet content, as previously described. For example, access node 230 may receive Internet content that is video content in the form of IPTV/SPTS. In this instance, video transcoder 235 may transcode the transport stream employing a video codec, such as a version of MPEG or VC 1. For example, DSL-based systems may employ MPEG-4 Part 10 compression due to lower bit rates, whereas an HFC or FTTP network may employ MPEG-2 compression due to the higher bandwidths available. In other instances, video transcoder 235 may transcode the transport stream to a data format, such as MPEG-2/DOCSIS. It is to be understood that access node 230 and/or video transcoder 235 may perform additional conditioning (e.g., other than transcoding) to the Internet content. For example, video transcoder 235 may perform additional processing, such as transrating, noise reduction, temporal filtering, forward error correction, etc. Still further, access node 230 and/or video transcoder 235 may perform different conditioning/processing than that specifically described herein.

Additionally, CISIM session manager 245 may command access node 230 to forward the requested Internet content to another node, such as video QAM 250 or data QAM 260. CISIM session manager 245 may also provide access node 230 with additional information, such as whether the request was received via a television service connection associated with television service or via an Internet service connection associated with Internet service, television channel information, data channel information, standard definition or high-definition, etc.

Video QAM 250 or data QAM 260 may apply a modulation scheme to the received Internet content, such as a MPEG-2 TS or a MPEG-2/DOCSIS stream. For example, video QAM 250 or data QAM 260 may employ QAM. In other implementations, environment 200 may employ a different modulation scheme.

Network resources may be allocated (Block 408). CISIM session manager 245 may command video QAM 250 or data QAM 260 to allocate network resources for delivering the Internet content to customer premises 270. In one example, CISIM session manager 245 may determine the network resources to be allocated based on requirements associated with the type of data of the Internet content. For instance, CISIM session manager 245 may command video QAM 250 to allocate bandwidth to transmit the Internet content, such as video content, on a particular television channel. In such an instance, in one implementation, an OD request via a television service connection associated with television service may be received on an OD television channel; however, the delivery of the Internet content may be on a different television channel. In this way, CISIM session manager 245 may command video QAM 250 to allocate bandwidth to transmit the Internet content on this television channel. In other instances, for example, CISIM session manager 245 may command data QAM 260 to allocate bandwidth to transmit Internet content over a data channel. Thus, for example, unlike a traditional Internet connection, where the Internet content may be delivered on a data channel while competing for bandwidth with other data (e.g., voice, etc.), CISIM session manager 245 may provide for a dedicated data channel to deliver the Internet content.

The Internet content may be provided to the customer premises (Block 410). In one implementation, the Internet content may be delivered to customer premises 270 in a unicast fashion. For example, when the Internet content is video content, the Internet content may be coupled with Real Time Transport Protocol/Real Time Streaming Protocol (RTP/RTSP) protocols, or some other unicast protocol scheme. When the Internet content is received within customer premises 270, client 272 may decode the payload so as to be displayed on a display device 274. For example, if display device 274 is a TV, client 272 may decode the Internet content for display on the TV. In other instances, if display device 274 is a computer, client 272 may decode the Internet content for display on the computer. Alternatively, or additionally, depending on the type of client 272, the Internet content may be provided wirelessly to any type of display device 274.

Since the processes described in FIG. 4 are exemplary, in other implementations, fewer, additional or different processes may be employed. For example, variations may exist depending on the type of television provider network (e.g., satellite versus cable), the network components contained therein and/or their proximity to the customer premises (e.g., last mile or not), the type of data of the Internet content (e.g., a live video feed, pre-recorded video, or a game), the arrangement between the Internet content provider and the television service provider, etc.

EXAMPLE

FIG. 5-FIG. 9 are diagrams illustrating an example for providing Internet content to a television subscriber. For purposes of discussion, assume that the customer has television and Internet services from the same service provider. Additionally, assume that the customer has purchased a monthly subscription for International Sports VOD. International Sports is a web site that provides live feeds of sporting events taking place anywhere in the world. The customer receives an additional channel (i.e., an International Sports channel) as well as an online account for International Sports.com.

Figure 5:
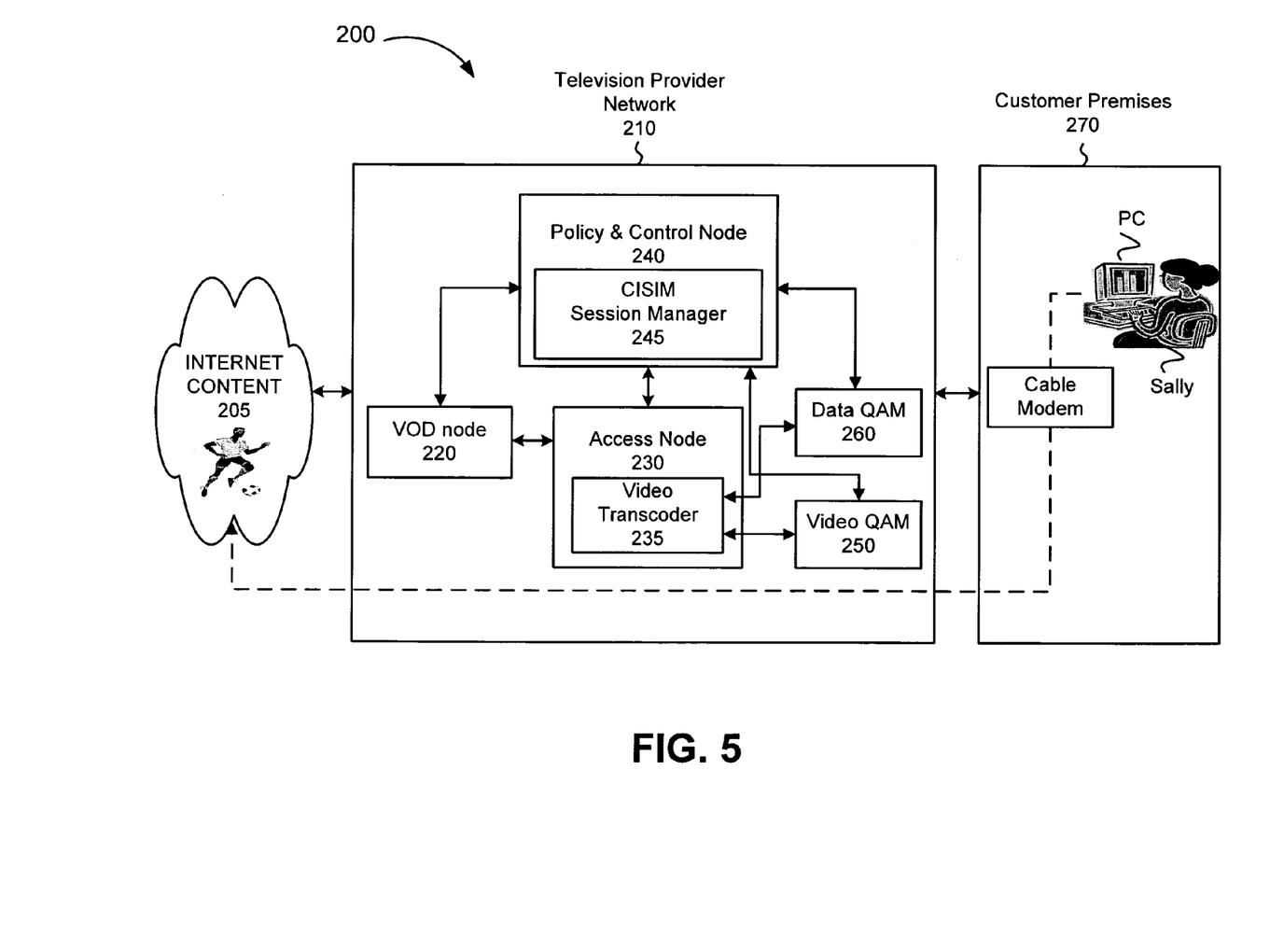
FIG. 5-FIG. 9 are diagrams illustrating an example for providing Internet content to a television subscriber.

As depicted in FIG. 5, the customer, Sally, is interested in watching a soccer game that is going to take place in Italy later today. Sally may use a personal computer (PC) a cable modem to establish an Internet connection. Sally visits International Sports.com and logs into her online account. Sally purchases the right to receive the soccer game taking place in Italy.

Figure 6:
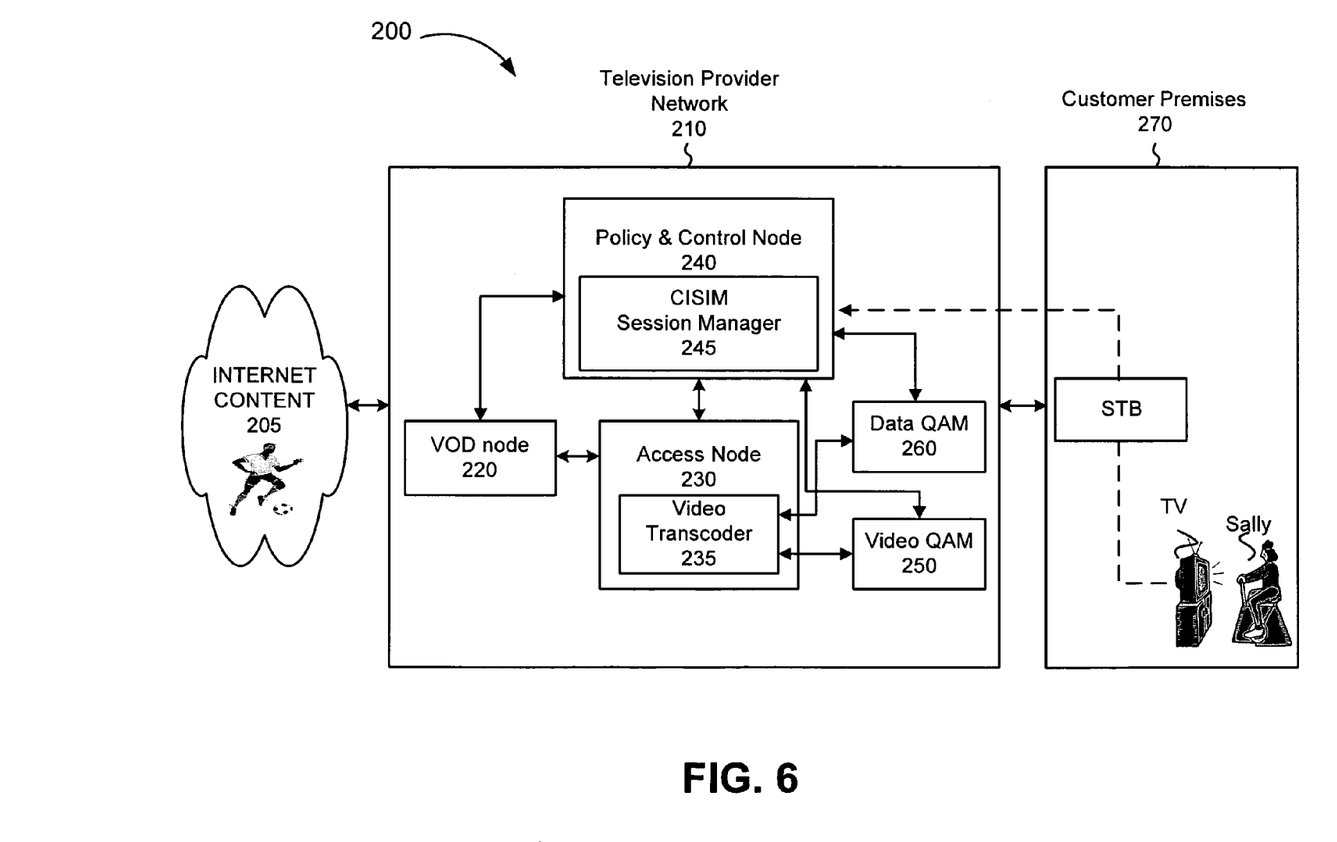
Figure 7:
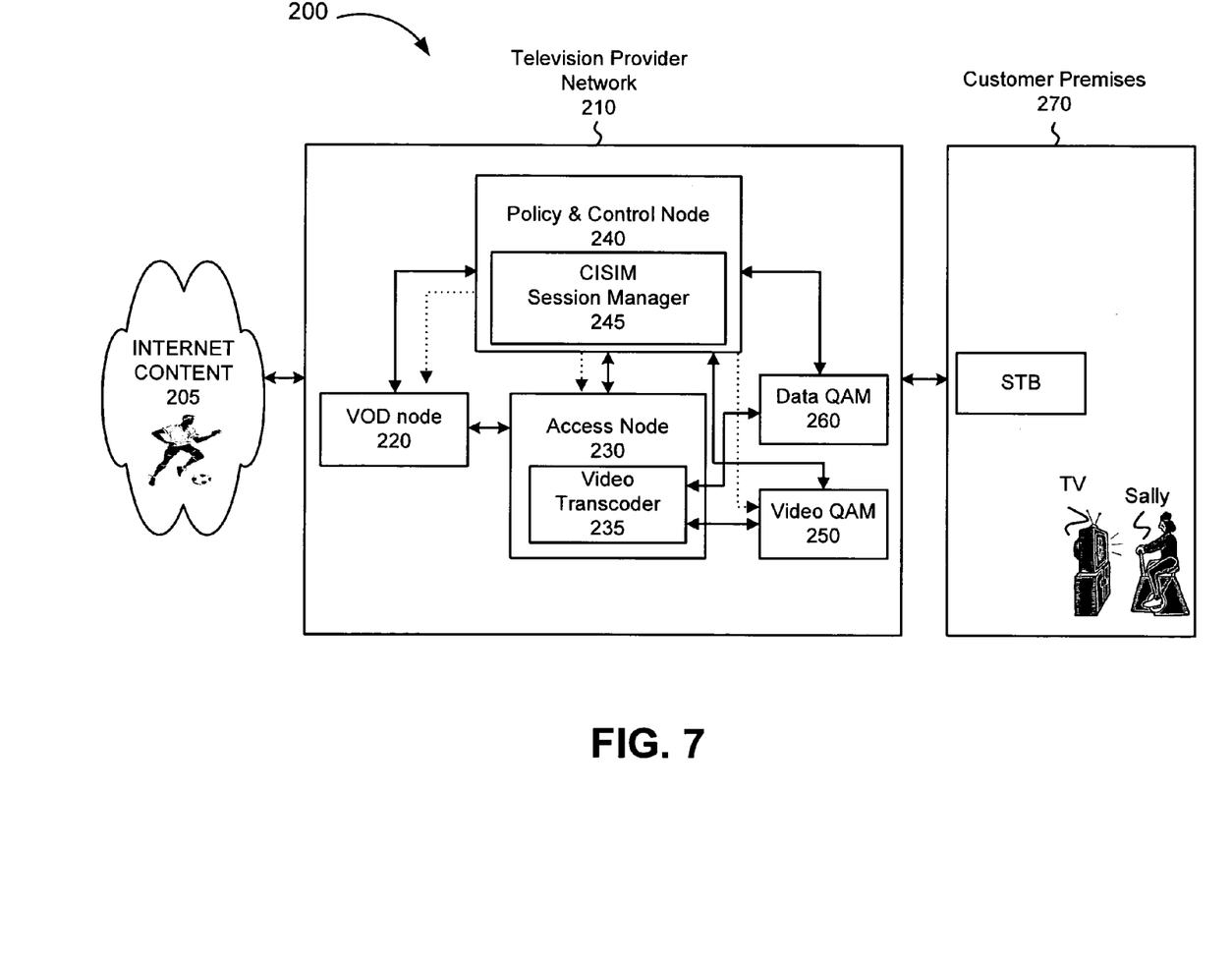
Figure 8:
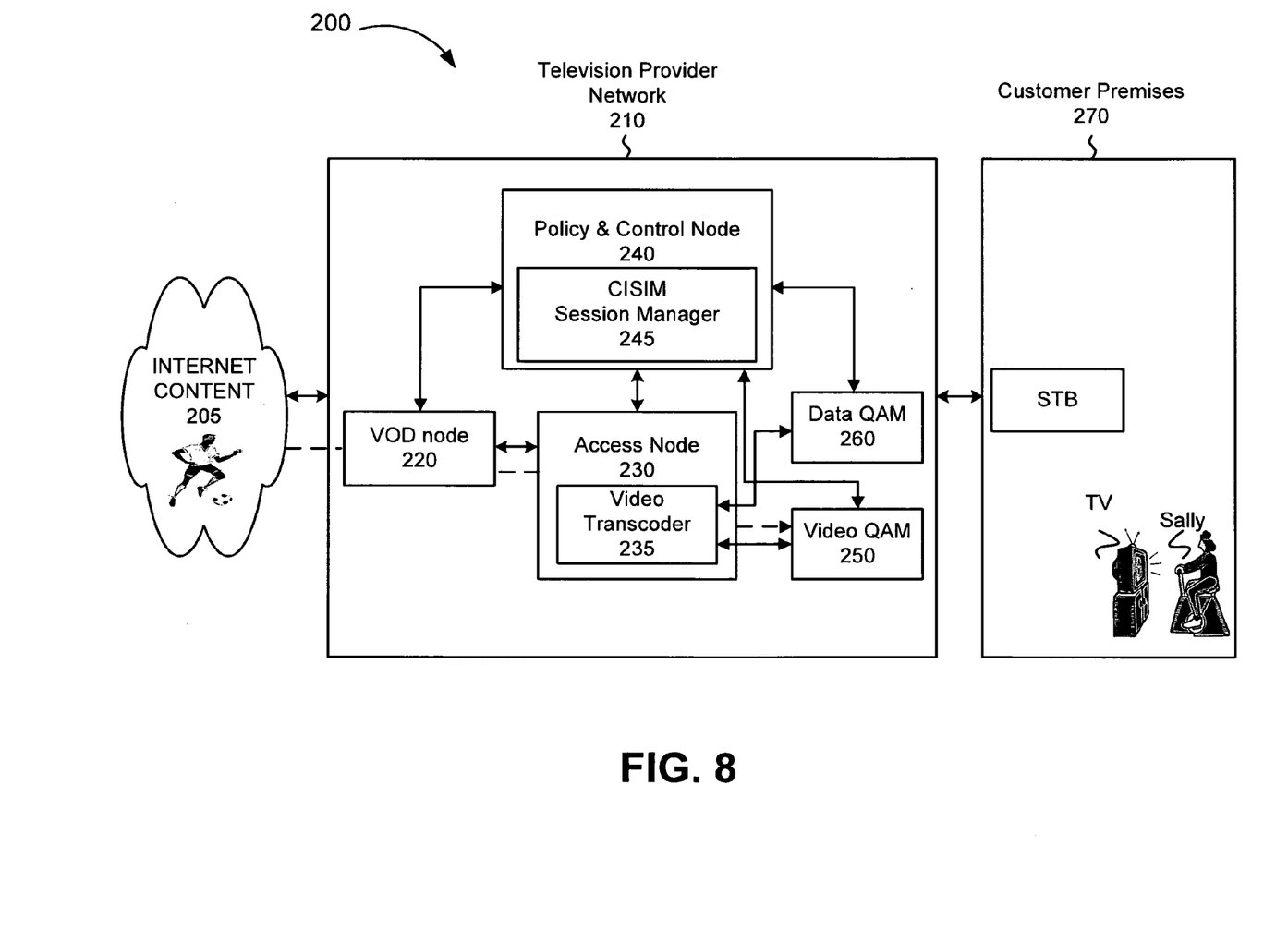
Figure 9:
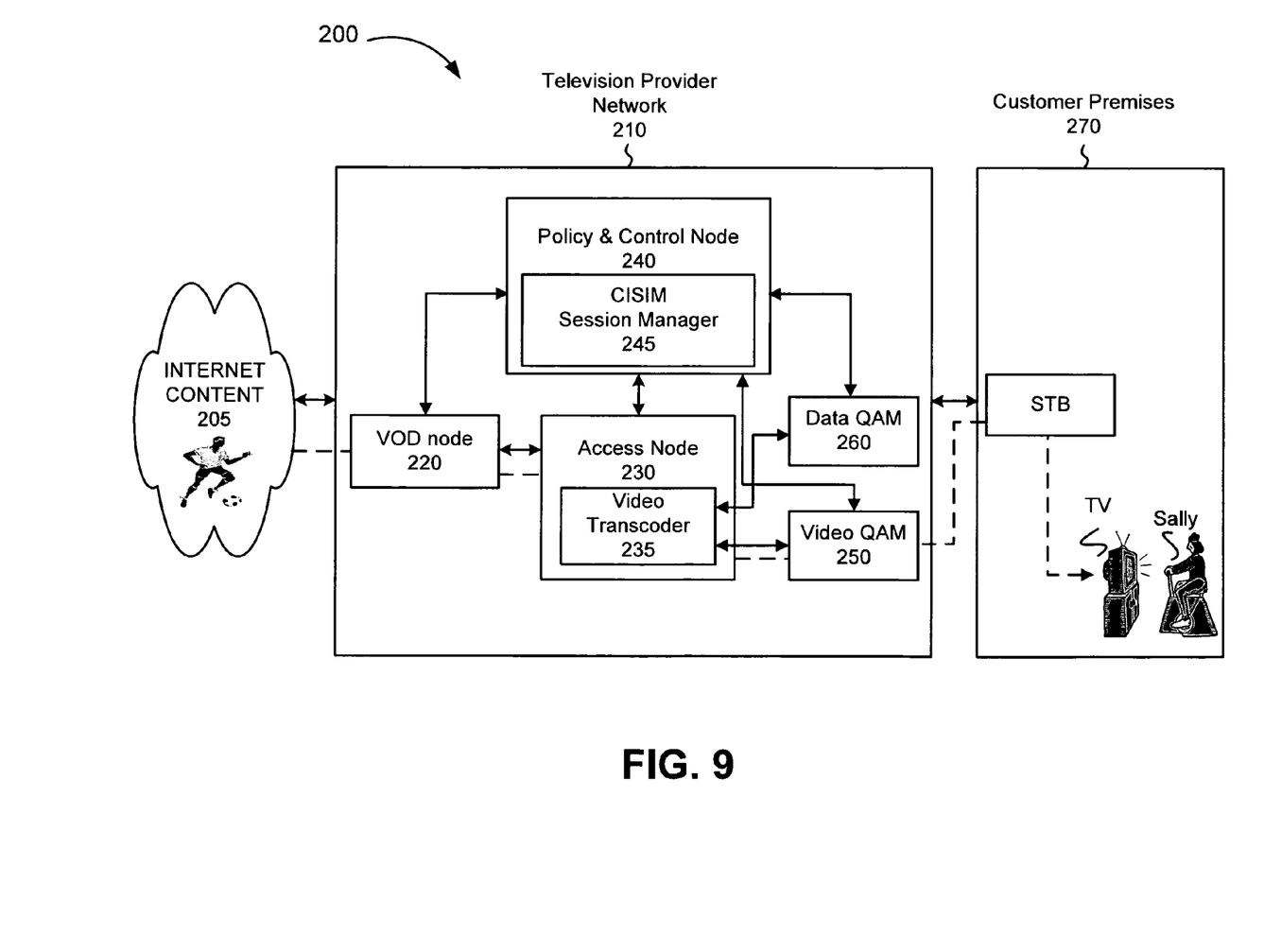

As depicted in FIG. 6, later that day, Sally tunes into the International Sports channel on her TV. Sally selects from a VOD menu system, with a remote control, the soccer game. Sally's selection is transmitted from a STB to policy and control node 240. In FIG. 7, CISIM session manager 245 recognizes the OD selection and commands VOD node 220, access node 230 and video QAM 250 to retrieve and condition the selected soccer game for delivery to Sally's TV. Since policy and control node 240 recognizes that Sally's selection was made via a television service connection and/or recognizes the type of data of the Internet content, video transcoder 235 and video QAM 250 correspondingly condition the live video feed. For example, as illustrated in FIG. 8, video transcoder 235 forwards the conditioned live video feed of the soccer game to video QAM 250. In FIG. 9, video QAM 250 may modulate the conditioned live video feed. In addition, video QAM 250 may allocate network resources based on one or more commands from policy and control node 240. The live soccer game may be delivered to Sally's TV via the STB. Sally enjoys the soccer game on her TV.

CONCLUSION

Internet-based multimedia, such as video content, etc., transported over ITV platforms or other data delivery systems suffer from quality of services issues and reliability issues (e.g., packet loss, picture break-up, delay, etc.). By providing a new partnership model between Internet content providers and television service providers and/or Internet service providers, a broader spectrum of content may be delivered to subscribers with significant improvements in quality of service and reliability.

As described herein, conditioning may be tailored to the type of data being delivered, unlike other high-speed data networks that may deliver all types of data the same way. Additionally, or alternatively, conditioning may be tailored to the service (e.g., television service or Internet service) from which a subscriber may wish to view the Internet content. Still further, a convergence between traditional television programming and Internet content may be incorporated into EPGs and/or interactive menu systems that will allow a subscriber to identify and select various multimedia from an expanded resource base.

The foregoing description of implementations provides an illustration, but is not intended to be exhaustive or to limit the implementations to the precise form disclosed. Modifications and variations are possible in light of the above teachings or may be acquired from practice of the teachings. For example, Internet content may be delivered to a subscriber without an OD request. That is, a television channel may deliver Internet content as part of a subscription service.

The description of FIG. 3 includes a discussion of software instructions contained on computer-readable media. Alternatively, in each of these implementations, hardwired circuitry may be used in place of or in combination with software instructions to implement processes described herein. Thus, implementations described herein are not limited to any specific combination of hardware circuitry and software.

In addition, while a series of blocks has been described with regard to the process illustrated in FIG. 4, the order of the blocks may be modified in other implementations. Further, non-dependent blocks may represent blocks that can be performed in parallel. For example, upon receiving an OD request, CISIM session manager 245 may provide commands to VOD node 220, access node 230, and video QAM 250 or data QAM 260, simultaneously. Additionally, or alternatively, conditioning and allocating of network resources may be performed in parallel.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Even though particular combinations of features are recited in the claims and/or disclosed in the specification, these combinations are not intended to limit the invention. In fact, many of these features may be combined in ways not specifically recited in the claims and/or disclosed in the specification.

What is claimed is:

1. A method performed by a computer system, the method comprising:
providing, by one or more processors associated with the computer system, a service to a customer device,
the service including a television service and an Internet service;
receiving, by the one or more processors, a request for Internet content from the customer device,
the request being received via the television service or the Internet service;

retrieving, by the one or more processors, the Internet content based on receiving the request;
determining, by the one or more processors, a type of data of the Internet content,
the type of data of the Internet content including:
real-time data, or
non-real-time data;
formatting, by the one or more processors, the Internet content based on the determined type of data of the Internet content and the request,
formatting the Internet content including:
formatting the Internet content from a particular format to a first data format when the determined type of data of the Internet content includes the real-time data, and
formatting the Internet content from the particular format to a second data format, different from the first data format, when the determined type of data of the Internet content includes the non-real-time data;
allocating, by the one or more processors, resources for delivering the Internet content in the first data format or the Internet content in the second data format,
the allocated resources corresponding to:
first resources when the determined type of data of the Internet content includes the real-time data, and
second resources, different from the first resources, when the determined type of data of the Internet content includes the non-real-time data; and
delivering to the customer device, by the one or more processors and using the allocated resources, the Internet content in the first data format or the Internet content in the second data format.

2. The method of claim 1, where the customer device includes one or more of a set top box, a cable modem, a display, a television, a computer, a portable device with a display, a stationary device with a display, or a game console.

3. The method of claim 1, where the Internet content is video content.

4. The method of claim 1, where the request is received via the television service, and
where receiving the request comprises:
receiving a selection from a video-on-demand menu system.

5. The method of claim 1, where the request is received via the television service, and
where retrieving the Internet content comprises:
retrieving the Internet content from an Internet site containing the Internet content.

6. The method of claim 1, where formatting the Internet content from the particular format to the first data format or formatting the Internet content from the particular format to the second data format comprises:
transcoding the Internet content.

7. The method of claim 1, where the request is received via the television service, and
where formatting the Internet content from the particular format to the first data format comprises:
converting Internet Television (ITV) packets, associated with the Internet content, to a transport stream.

8. The method of claim 1, where the request is received via the Internet service, and
where formatting the Internet content from the particular format to the second data format comprises:
converting Internet Television (ITV) packets, associated with the Internet content, to a Data Over Cable Service Interface Specification (DOCSIS) format.

9. The method of claim 1, where the request is received via the television service, and
where allocating the resources comprises:
dedicating bandwidth for a television channel associated with the television service.

10. The method of claim 1, where delivering the Internet content in the first data format or the Internet content in the second data format comprises:
delivering the Internet content to the customer device via unicast.

11. A system comprising:
a network device to deliver a service to a customer device,
the service including a television service and an Internet service,
the network device comprising one or more processors to:
receive a request for Internet data from the customer device;
determine that:
the request was received via a first one of the television service or the Internet service, and
the Internet data is to be delivered via a second one of the television service or the Internet service;
obtain the Internet data based on receiving the request;
determine a type of data of the Internet data,
the type of data of the Internet data including:
real-time data, or
non-real-time data;
format the Internet data from one data format to a particular data format based on:
the type of data of the Internet data, and
at least one of:
the first one of the television service or the Internet service, or
the second one of the television service or the Internet service,
the particular data format corresponding to a first particular data format when the type of data of the Internet data includes the real-time data, and
the particular data format corresponding to a second particular data format, different from the first particular data format, when the type of data of the Internet data includes the non-real-time data;
dedicate first network resources to deliver the Internet data, in the particular data format, based on network resource requirements associated with the real-time data when the type of data of the Internet data includes the real-time data;
dedicate second network resources to deliver the Internet data, in the particular data format, based on network resource requirements associated with the non-real-time data when the type of data of the Internet data includes the non-real-time data; and
deliver the Internet data, in the particular data format, to the customer device based on the dedicated first network resources or the dedicated second network resources.

12. The system of claim 11, where the Internet data includes video content, and
where, when the one or more processors receive the request, the one or more processors are to:
process a video-on-demand request.

13. The system of claim 11, where the request is received via the television service, and the customer device includes a television.

14. The system of claim 11, where the request is received via the television service, and where, when the one or more processors obtain the Internet data, the one or more processors are to:
retrieve the Internet data from an Internet site that contains the requested Internet data.

15. The system of claim 11, where, when the one or more processors obtain the Internet data, the one or more processors are to:
store video-on-demand Internet data; and
periodically update the video-on-demand Internet data using data from one or more Internet sites.

16. The system of claim 11, where the Internet data includes video content,
where the request is received via the television service,
where the Internet data is to be delivered via the Internet service, and
where, when the one or more processors format the Internet data, the one or more processors are to:
transcode the Internet data to a data stream based on determining that the Internet data is to be delivered via the Internet service.

17. The system of claim 11, where the Internet data includes video content,
where the request is received via the Internet service,
where the Internet data is to be delivered via the television service, and
where, when the one or more processors format the Internet data, the one or more processors are to:
transcode the Internet data to a transport stream based on determining that the Internet data is to be delivered via the television service.

18. The system of claim 15, where, when the one or more processors dedicate the first network resources or dedicate the second network resources, the one or more processors are to:
dedicate bandwidth to transmit the Internet data over a data channel associated with the second one of the television service or the Internet service.

19. The system of claim 16, where, when the one or more processors dedicate the first network resources or dedicate the second network resources, the one or more processors are to:
dedicate bandwidth to transmit the Internet data over a television channel associated with the second one of the television service or the Internet service.

20. One or more devices comprising:
one or more memories to store instructions; and
one or more processors to execute the instructions to:
store one or more network policies,
receive a request for Internet content from a customer device,
determine whether the Internet content is to be delivered to the customer device via a television service or an Internet service,
determine a type of data of the Internet content,
the type of data of the Internet content including:
real-time data, or
non-real-time data,
issue one or more commands based on the one or more network policies, the one or more commands including:
a command to format the Internet content from a particular format to a first data format, when the type of data of the Internet content includes the real-time data,
a command to format the Internet content from the particular format to a second data format, different from the first data format, when the type of data of the Internet content includes the non-real-time data, and
a command to allocate:
first resources for delivering the Internet content, in the first data format or in the second data format, based on one or more requirements associated with the real-time data when the type of data of the Internet content includes the real-time data, or
second resources for delivering the Internet content, in the first data format or in the second data format, based on one or more requirements associated with the non-real-time data when the type of data of the Internet content includes the non-real-time data, and
deliver the Internet content, in the first data format or in the second data format, to the customer device via the television service or the Internet service based on:
determining whether the Internet content is to be delivered to the customer device via the television service or the Internet service, and
the allocated first resources or the allocated second resources.

21. The one or more devices of claim 20, where, when receiving the request, the one or more processors are to:
determine television channel information based on the request,
where the Internet content, in the first data format or in the second data format, is delivered to the customer device further based on the television channel information.

22. The one or more devices of claim 20, where, when receiving the request, the one or more processors are to:
receive the request from a video-on-demand menu application associated with the customer device.

23. The one or more devices of claim 20, where the one or more commands further include a command to retrieve the Internet content from an Internet site associated with the Internet content.

24. The one or more devices of claim 20, where the one or more commands further include a command to deliver the Internet content on a television channel when the request is received via the television service.

25. The one or more devices of claim 20, where the one or more commands further include a command to deliver the Internet content on a data channel when the request is received via the Internet service.

* * * * *

UNITED STATES PATENT AND TRADEMARK OFFICE
CERTIFICATE OF CORRECTION

| | | |
|---|---|---|
| PATENT NO. | : 9,264,743 B1 | Page 1 of 1 |
| APPLICATION NO. | : 11/851181 | |
| DATED | : February 16, 2016 | |
| INVENTOR(S) | : Timothy Diep et al. | |

It is certified that error appears in the above-identified patent and that said Letters Patent is hereby corrected as shown below:

In the Claims

Please correct Claim 19 as follows:

Column 13, line 41, replace "television" with -- data --.

Signed and Sealed this
Fourteenth Day of June, 2016

Michelle K. Lee
*Director of the United States Patent and Trademark Office*